(12) United States Patent
Ruden et al.

(10) Patent No.: US 8,069,554 B2
(45) Date of Patent: Dec. 6, 2011

(54) ASSEMBLY AND METHOD FOR INSTALLING A DISC CLAMP

(75) Inventors: Shawn A. Ruden, Longmont, CO (US); Roland Sesselmann, Longmont, CO (US); Samuel E. Severson, Denver, CO (US)

(73) Assignee: Seagate Technology, Cupertino, CA (US)

( * ) Notice: Subject to any disclaimer, the term of this patent is extended or adjusted under 35 U.S.C. 154(b) by 1002 days.

(21) Appl. No.: 11/786,479

(22) Filed: Apr. 12, 2007

(65) Prior Publication Data

US 2008/0250629 A1   Oct. 16, 2008

(51) Int. Cl.
*G11B 5/127* (2006.01)
*H04R 31/00* (2006.01)

(52) U.S. Cl. ............... 29/603.04; 29/603.03; 29/737; 29/759; 360/98.08; 360/97.01; 73/468; 73/487

(58) Field of Classification Search .. 29/603.03–603.05, 29/737, 759–761; 360/98.08–99.12, 97.01; 73/468, 487

See application file for complete search history.

(56) References Cited

U.S. PATENT DOCUMENTS

| | | | | |
|---|---|---|---|---|
| 5,101,306 A | * | 3/1992 | Johnson | 360/98.08 |
| 5,243,481 A | * | 9/1993 | Dunckley et al. | 360/99.08 |
| 5,550,690 A | * | 8/1996 | Boutaghou et al. | 360/99.12 |
| 5,731,928 A | | 3/1998 | Jabbari et al. | 360/98.08 |
| 5,942,820 A | * | 8/1999 | Yoshida | 310/67 R |
| 6,304,412 B1 | * | 10/2001 | Voights | 360/98.08 |
| 6,483,661 B1 | | 11/2002 | Martin et al. | 360/99.12 |
| 6,760,188 B2 | | 7/2004 | Choo et al. | 360/99.12 |

* cited by examiner

*Primary Examiner* — Derris Banks
*Assistant Examiner* — Jeffrey T Carley
(74) *Attorney, Agent, or Firm* — Braden Katterheinrich

(57) ABSTRACT

The application discloses an assembly tool for installing a disc clamp on a spindle hub. In the illustrated embodiments, the assembly tool includes a head including an inner portion, an intermediate portion and an outer portion configured to install a disc clamp on a spindle motor assembly. In the illustrated embodiments, the inner portion includes a raised portion and datum surface that interface with the spindle hub to align the spindle hub for installation of the disc clamp.

19 Claims, 13 Drawing Sheets

ASSEMBLY AND METHOD FOR INSTALLING A DISC CLAMP

CROSS REFERENCE TO PENDING APPLICATION

Applicants hereby incorporate by reference the disclosure of U.S. application Ser. No. 11/734,450, entitled "MAGNETIC MEDIUM STACK ASSEMBLY FOR A DATA STORAGE AND RETRIEVAL SYSTEM", filed on the same date as the present application, in its entirety.

BACKGROUND

Data storage devices include one or more discs to store digitally encoded data. The one or more discs are coupled to a spindle motor or assembly for rotation. The discs are secured to the spindle motor or assembly via a disc clamp. Assembly of the disc clamp to the spindle motor or assembly involves the application of force. The application of force during the assembly process can interfere with disc placement and can damage or interfere with alignment of the spindle components. In particular, unbalanced forces applied during assembly can interfere with disc alignment inducing runout errors during operation of the data storage device. Embodiments of the present invention provide solutions to these and other problems, and offer other advantages over the prior art.

SUMMARY

The invention provides an assembly tool for installing a disc clamp on a spindle hub. In illustrated embodiments, the assembly tool includes a head including an inner portion, an intermediate portion and an outer portion configured to install the disc clamp on a spindle motor assembly. In the illustrated embodiments, the inner portion includes a raised portion and datum surface that interface with the spindle hub to align the spindle hub for installation of the disc clamp.

Other features and benefits that characterize embodiments of the present invention will be apparent upon reading the following detailed description and review of the associated drawings.

DETAILED DESCRIPTION OF ILLUSTRATIVE EMBODIMENTS

Figure 1:
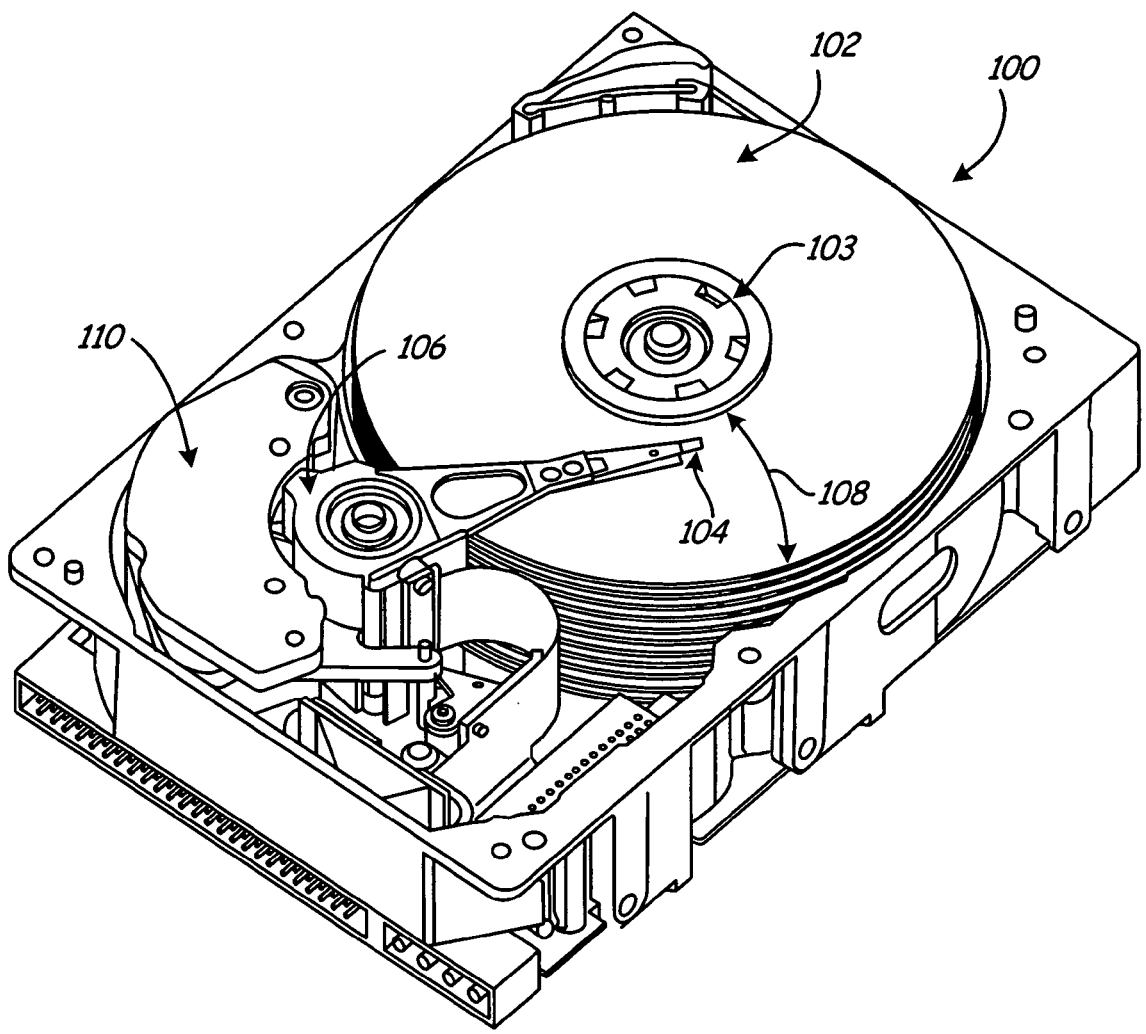
FIG. 1 is a perspective illustration of a data storage device.

FIG. 1 illustrates a data storage device 100 in which embodiments of the present invention are useful. The data storage device 100 shown includes a plurality of discs 102, however, application is not limited to the particular data storage device or plurality of discs shown. Discs 102 are coupled to a spindle motor assembly for rotation via a disc clamp 103. Heads 104 are coupled to an actuator assembly 106. The actuator assembly 106 is movable (as illustrated by arrow 108) via a voice coil motor 110 and/or other microactuator assembly (not shown) to position the heads 104 relative to tracks on a rotating disc (as illustrated by arrow 108) to read data from and/or write data to the disc or storage medium.

Figure 2:
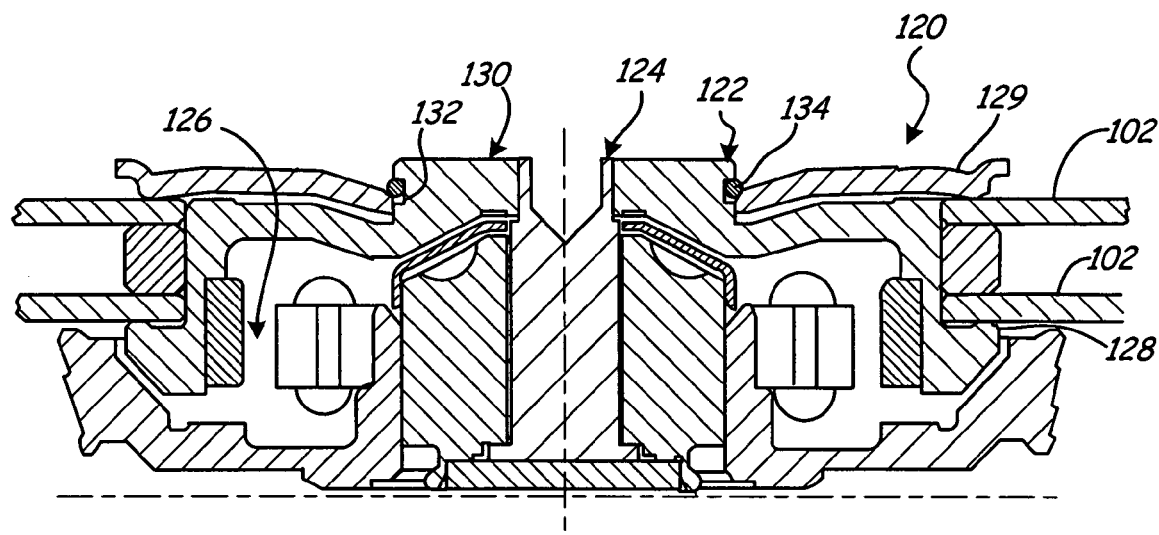
FIG. 2 is a cross-sectional illustration of a spindle motor assembly wherein data storage discs are secured relative to a spindle hub via a disc clamp.

FIG. 2 illustrates an embodiment of the spindle motor assembly 120 for rotatably supporting discs 102. The spindle motor assembly 120 includes a spindle portion 122 rotatable about a stationary portion or shaft 124. The spindle portion 122 is rotated about the stationary portion 124 via operation of a motor assembly 126 as will be appreciated by those skilled in the art. Discs 102 are supported on an annular rim 128 about the spindle portion 122 and are clamped to the rim 128 via a screwless disc clamp 129. In the illustrated embodiment, one or more discs 102 are stacked on the annular rim 128 however, application is not limited to a particular number of discs 102.

The screwless disc clamp 129 is annular shaped and includes an inner portion proximate to a center opening and an outer portion spaced from the center portion. As shown, in FIG. 2, the inner portion of the disc clamp is secured to a hub 130 of the spindle portion and an outer portion of the clamp engages or contacts an inner surface of the discs 102 to secure one or more discs to the spindle motor assembly 120. In the illustrated embodiment the spindle hub 130 includes an annular groove 132 that is recessed or spaced from an upper surface of the spindle hub 130. In the illustrated embodiment, the clamp 129 is secured to the spindle hub 130 via a retaining ring 134, which is inserted into the annular groove 132 and abuts an inner portion of the disc clamp to secure the disc clamp to the spindle hub 130.

Figure 3:
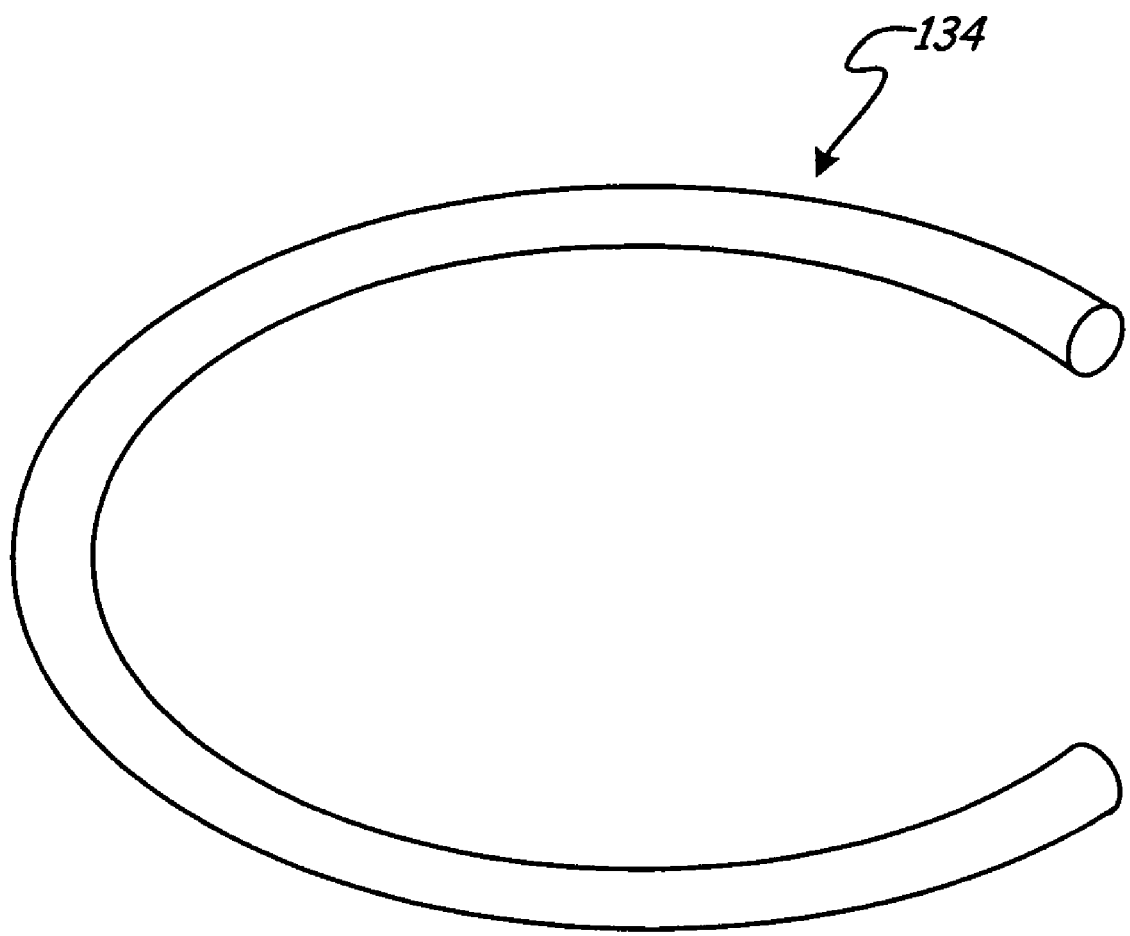
FIG. 3 is a perspective illustration of an embodiment of a retaining ring for securing the disc clamp of FIG. 2 to the spindle hub.

FIG. 3 illustrates an embodiment of a retaining ring 134. As shown in the illustrated embodiment the retaining ring 134 is formed of a generally "C" shaped body having an expandable diameter. For assembly, the diameter of the ring 134 is expanded so that the ring is insertable over the spindle hub 130. When the ring 134 is aligned with groove 132 of the spindle hub 130, the ring is released or contracted so that the ring 134 snaps or contracts into place in the recessed groove 132 as shown in FIG. 2 to secure the disc clamp 129 to the spindle hub 130. The size and shape of the retaining ring 134 is sufficient to secure the disc clamp 129 to the spindle hub 130 so that an outer portion of the clamp contacts the discs to secure the discs to the rotating spindle portion 122. Although a particular retaining ring and disc clamp design is shown in FIGS. 2-3, application of the present invention is not limited to the particular designs or embodiments shown.

Figure 4:
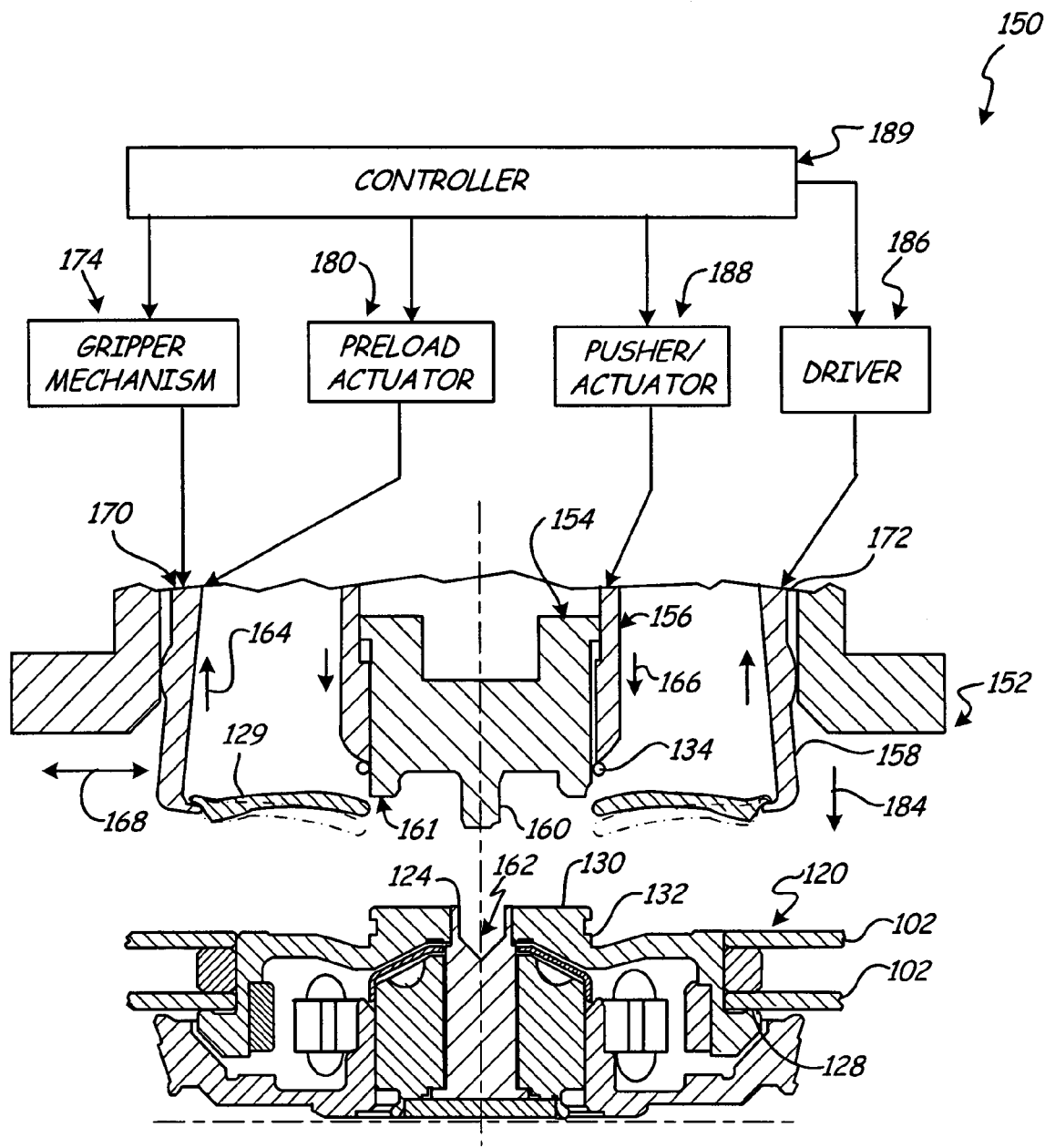
FIG. 4 is a schematic illustration of an embodiment of an assembly tool to install a disc clamp on a spindle hub.

During assembly of the disc clamp 129 even slight contact between the disc clamp and disc or discs 102 can interfere with alignment and placement of the discs 102. FIG. 4 schematically illustrates an embodiment of a clamp installation tool 150 to install the disc clamp 129 to a spindle motor assembly 120. As shown, the clamp installation tool 150 includes a tool head 152 having multiple portions, which in the illustrated embodiment include an inner portion 154, an intermediate portion 156 and an outer portion 158. In the illustrated embodiment the inner portion 154 includes a raised center portion 160 and traverse datum surface 161 to align the tool head 152 and the spindle assembly to install the disc clamp. As shown, the raised center portion 160 forms an extension which is sized to interface with a center bore 162 of the spindle assembly or spindle hub 130 to align the head for clamp installation.

The outer tool portion 158 is radially spaced from the inner tool portion 154 and is movable in an axial direction as illustrated by arrow 164 to supply a preload force along an outer portion of the disc clamp 129 as will be described. The intermediate tool portion 156 is spaced radially inwardly of the outer tool portion 158 and is movable in the axial direction as illustrated by arrow 166 to impart a downward force to an inner portion of the clamp to preload the clamp. The intermediate tool portion 156 also moves in the axial direction to install the retaining ring 134 to secure the disc clamp 129 to the spindle hub 130.

The outer tool portion 158 includes separate segments that are movable in a radial direction as illustrated by arrow 168 to form gripper portions 170, 172 for gripping and releasing the disc clamp 129. The gripper portions 170, 172 are movable between an opened position and a closed position to grip the disc clamp 129 via operations of a gripper mechanism 174. The gripper mechanism 174 is operably coupled to the gripper portions 170, 172 to move the gripper portions 170, 172 outwardly to open the gripper portions 170, 172 to load the disc clamp 129 and to close the gripper portions 170, 172 to grip the clamp 129.

As shown, a preload actuator 180 is coupled to the gripper portions 170, 172 to move the gripper portions in an upwardly direction as illustrated by arrow 164 relative to spindle motor assembly to supply the preload force to the outer portion of the disc clamp 129. The preload force keeps the disc clamp 129 from contacting the discs while the disc clamp 129 is installed on the spindle hub 130. The tool head 152 is moved in the axial direction (or lowered) as illustrated by arrow 184 via operation of driver 186 to load the disc clamp 129 on or about the spindle hub 130. An pusher/actuator 188 is coupled to the intermediate portion 156 of the tool head 152 and moves the intermediate portion 156 in the downward direction as illustrated by arrow 166 toward the spindle hub 130 to supply the preload force and install or push the retaining ring 134 into groove 132 to secure the disc clamp 129 to the spindle assembly. Operation of the gripper mechanism 174, preload actuator 180, pusher/actuator 188 and driver 186 is controlled via controller 189.

Figure 5:
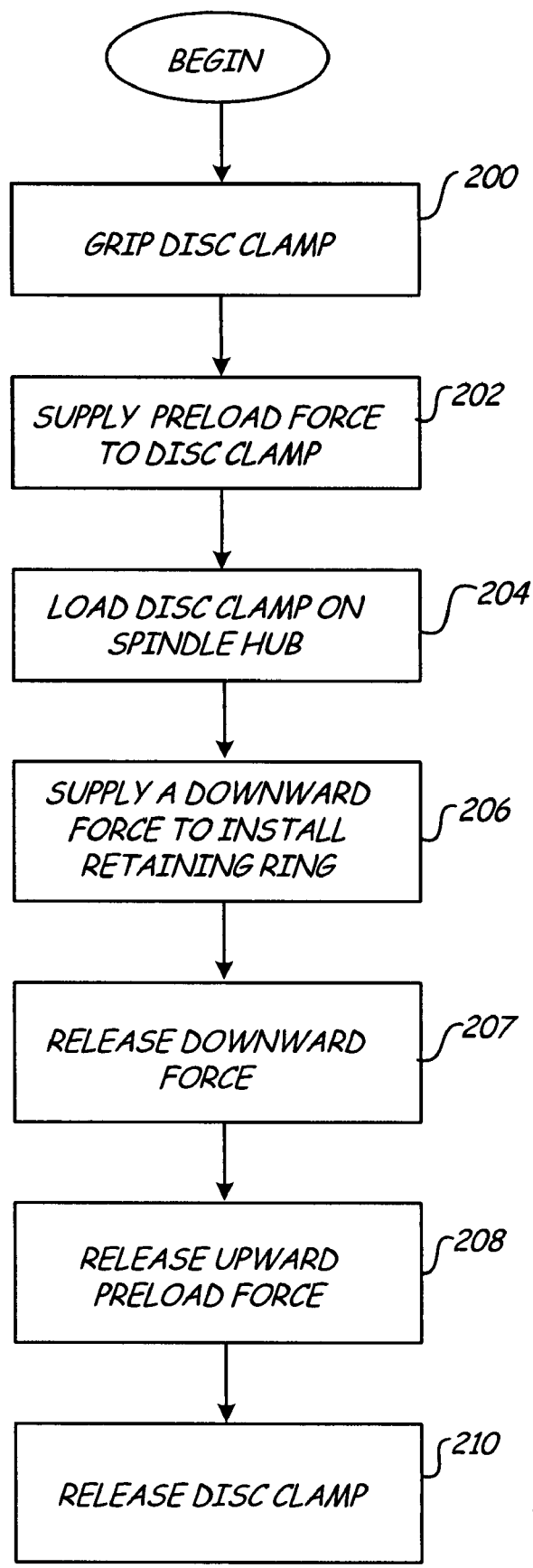
FIG. 5 illustrates steps for installing a disc clamp on a spindle hub according to an illustrative embodiment.

For installation, as illustrated in FIG. 5, the gripper portions 170, 172 of the installation tool 150 (shown in FIG. 4) grip the disc clamp 129 in step 200. Thereafter, a preload force is supplied to the outer portion and intermediate portion of the disc clamp 129 in step 202. In the illustrated embodiment, the preload force provides a downward force and an upwardly directed force to limit disc contact while the disc clamp 129 is installed. In step 204, the disc clamp 129 is loaded onto the spindle hub 130 via operation of the driver 186. Driver 186 lowers the head 152 (and disc clamp 129) to load the clamp 129 on the spindle hub 130. In the embodiment illustrated in FIG. 4, as the driver 186 lowers the tool head 152, the raised center portion 160 interfaces with center bore 162 of the spindle assembly to align the tool relative to the spindle motor assembly.

In step 206, the retaining ring 134 is installed. In the illustrated embodiment, the retaining ring 134 is preloaded on the installation tool 150 and is snapped into place in the recessed groove 132 of the spindle hub 130 upon application of the downward force imparted through the intermediate portion 156 of the head 152. After, the retaining ring 134 is installed, the downward force is released in step 207 so that the spindle motor assembly 120 is biased against the datum surface 161 of the tool head 152 via the upward force imparted through outer portion 158 of the head 152. The spindle motor assembly 120 is biased against the datum surface 161 to align the spindle hub 130 relative to the head 152 prior to releasing the disc clamp for installation. In step 208, the upward preload force is released from the outer portion of the disc clamp 129 so that the disc clamp 129 contacts the disc 102 to complete the installation. In step 210, the gripper portions 170, 172 are separated to release the disc clamp. Following installation, the driver 186 retracts the tool head 152 from the spindle assembly. In the illustrated embodiment, controller 189 is configured to implement the processing steps illustrated in FIG. 5.

As described, the preload force proximate to the outer portion of the disc clamp 129 limits disc contact to reduce misalignment or shifting of the discs. As disclosed, the disc clamp is loaded onto the spindle hub 130 and secured via retaining ring 134 in groove 132 as shown in FIG. 2. As described, after the disc clamp 129 is loaded onto the spindle hub 130, the downward force is released prior to the release of the upward force so that the upward force biases the spindle hub 130 against the datum surface 161 via contact between the inner portion of the disc clamp and the spindle hub 130 through the retaining ring 134 installed in the groove 132 between the disc clamp 129 and the spindle hub 130. Since the downward force is released prior to release of the upward force, the disc clamp 129 is in a final installed shape when the upward force is released and the disc clamp first contacts the disc to minimize relative radial movement between the disc clamp and media during installation of the disc clamp 129.

Figure 6:
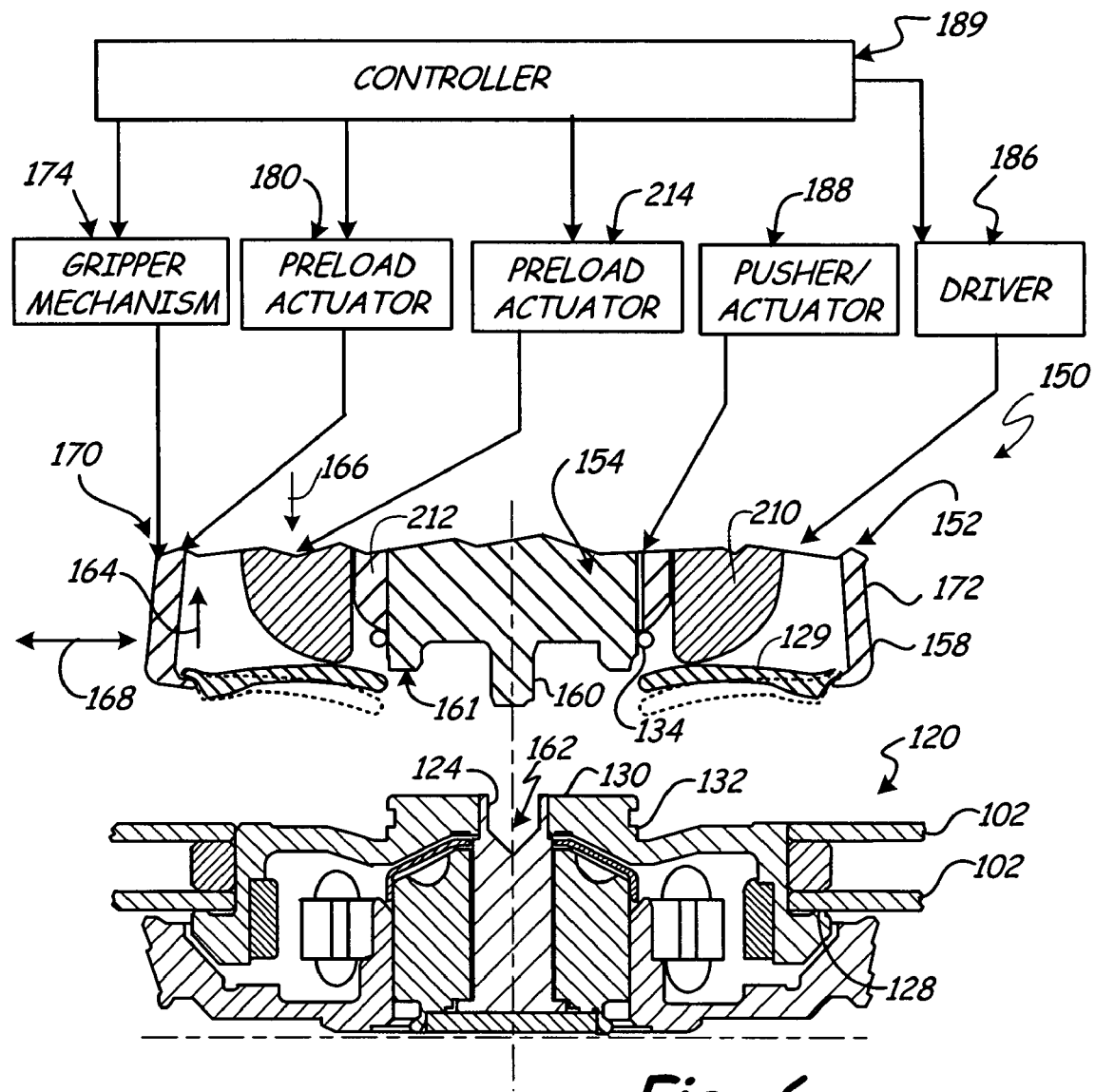
FIG. 6 schematically illustrates an alternate embodiment of an assembly tool to install a disc clamp on a spindle hub.

FIG. 6 illustrates an alternate embodiment of an installation tool 150 that includes a tool head 152 having an inner portion 154, a first intermediate portion 210, second intermediate portion 212 and an outer portion 158 where like numbers are used to refer to like parts in the previous FIGS. As previously described with respect to FIG. 4, the inner portion 154 of the illustrated tool head includes a raised center portion 160 and traverse datum surface 161. The raised center portion 160 is sized for insertion into a center bore 162 of the stationary portion or shaft 124 to align the tool head 152 relative to the spindle assembly. Each of the first intermediate portion 210, second intermediate portion 212 and outer portion 158 are radially spaced from the inner portion 154 of the head 152.

As previously described, the outer tool portion 158 includes multiple sections movable in a radial direction as illustrated by arrow 168 to form the gripper portions 170, 172 for gripping and releasing a disc clamp 129. The gripper portions 170, 172 are moved in the radial direction via operation of the gripper actuator mechanism 174 illustrated schematically in FIG. 6. As previously described with respect to FIG. 4, the gripper portions 170, 172 are also movable in the axial direction as illustrated by arrow 164 via operation of a first or outer preload actuator 180 to provide an upward or lifting force to an outer portion of the disc clamp 129.

In the illustrated embodiment, tool head 152 shown in FIG. 6 includes multiple first and second intermediate portions 210, 212 which are movable in the axial direction as illustrated by arrow 166. The first intermediate portion 210 is spaced radially inwardly of the outer portion 158 and outwardly of the second intermediate portion 212. The first intermediate portion 210 is moved in the axial direction via operation of a second or inner preload actuator 214 to cooperatively preload the disc clamp 129. In particular, as shown, the gripper portions 170, 172 are moved in an upwardly direction away from the spindle hub 130 and the first intermediate portion 210 is moved in a downwardly direction toward the spindle hub 130 to preload the clamp 129 for installation.

In the illustrated embodiment, the second intermediate portion 212 is spaced radially inwardly of the outer portion 158 and first intermediate portion 210 and is movable in a downwardly direction towards the spindle hub 130 to install the retaining ring 134 via operation of pusher/actuator 188. The second intermediate portion 212 is shaped to expand the retaining ring 134 to fit over the spindle hub as the intermediate portion 212 is moved downwardly to install the retaining ring 134. As shown, operation of the gripper mechanism 174, preload actuator 180, pusher/actuator 188, driver 186 and preload actuator 214 is controlled via controller 189.

Figure 7:
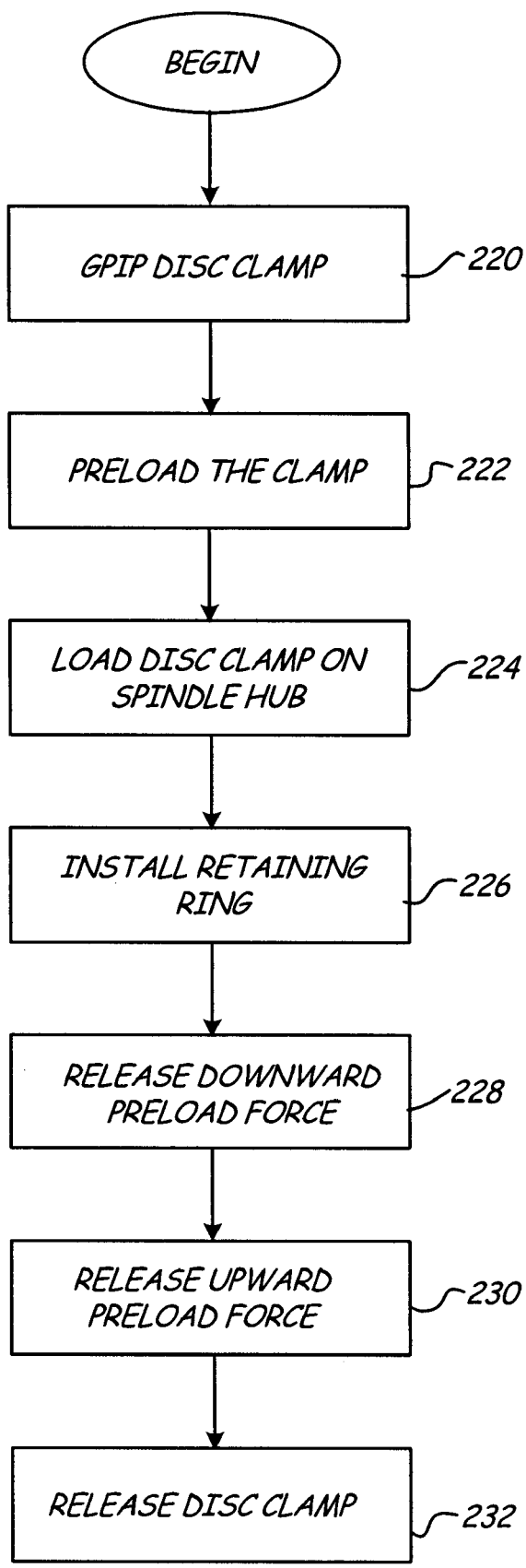
FIG. 7 illustrates assembly steps for installing a disc clamp on a spindle hub according to an alternate illustrative embodiment.

For installation as illustrated in FIG. 7, as previously described, the gripper portions 170, 172 grip the disc clamp in step 220. In step 222, multiple preload forces are supplied to the disc clamp 129. In particular, in the illustrated embodiment, the multiple preload forces include an upward preload force supplied to the outer portion of the disc clamp through the gripper portions 170, 172 and a downward preload force supplied to an intermediate portion of the disc clamp 129 through intermediate portion 210. In step 224, the tool head 152 is lowered or positioned via driver 186 to load the disc clamp on the spindle hub 130. In step 226, a downward pusher force is supplied via the second intermediate portion 212 and pusher/actuator 188 to install the retaining ring 134 on the spindle hub 130. Thus as described, the tool head includes separate portions to supply a downward preload force to the disc clamp and install the retaining ring 134 in contrast to the embodiment illustrated in FIG. 4.

Once the retaining ring 134 is installed as illustrated in step 226, the inner or downward preload force is released in step 228. Upon release of the downward preload force in step 228, the outer or upward preload force acts to bias the spindle hub 130 against the datum surface 161 of the tool head 152. Next in step 230, the outer or upward force is released to install the disc clamp on the spindle motor assembly 120. In particular, the upward force supplied to the outer portion of disc clamp is released so that the disc clamp contacts the disc to secure the disc or media to the spindle assembly. As previously described, since the downward preload force is released prior to release of the upward preload force, the disc clamp is in a final installed shape when the upward preload force is released and the disc clamp first contacts the disc to minimize relative movement between the disc clamp and media. In step 232 the disc clamp is released from gripper portions 170, 172 to complete the installation. In particular, in the embodiment shown in FIG. 6, the gripper portions 170, 172 are moved outwardly to release the disc clamp in step 232.

Figure 8:
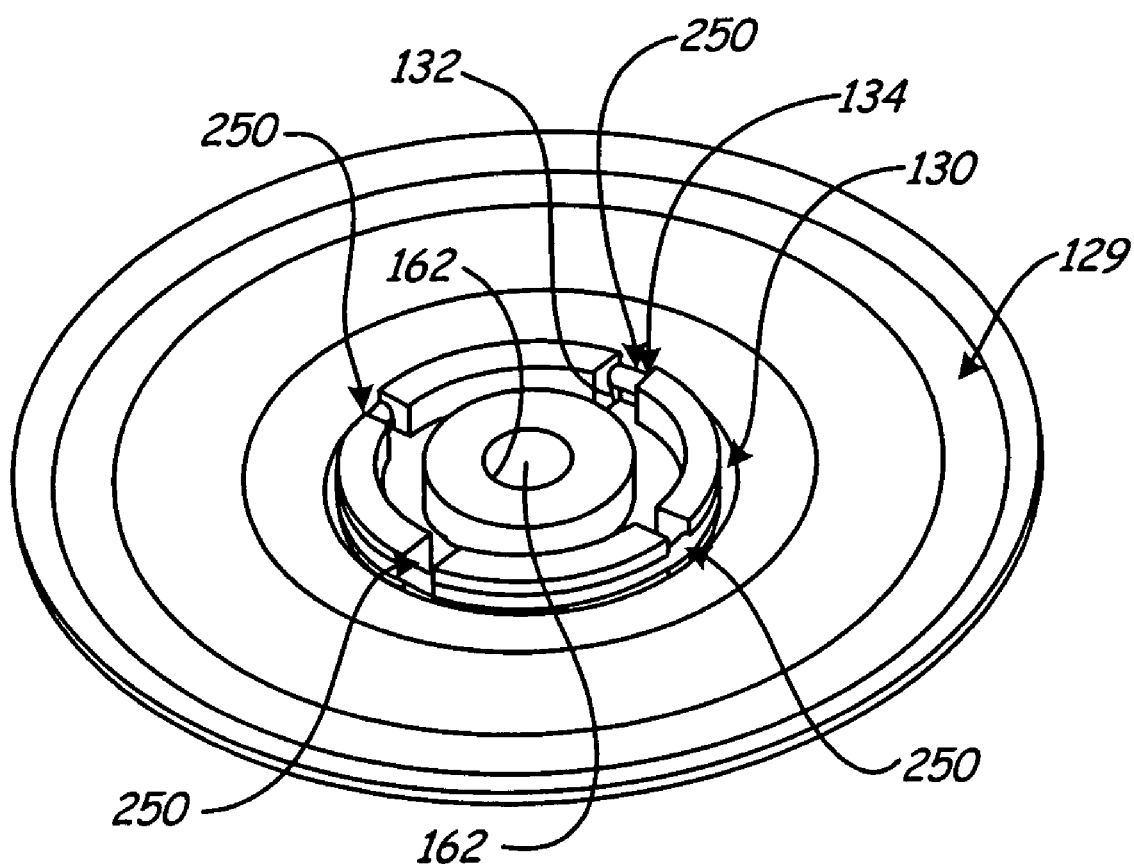
FIG. 8 illustrates an embodiment of a spindle hub having a disc clamp secured thereto via a retaining ring.

FIG. 8 illustrates an alternate embodiment of a spindle hub including a plurality of notches 250 spaced about a circumference of the spindle hub 130. Notches 250 allow access to the retaining ring 134 in groove 132 so that the retaining ring 134 can be removed to remove the disc clamp from the spindle hub 130 following assembly of the disc clamp. For example, the disc clamp may be removed to remove a defective disc from the spindle assembly. The disc clamp 129 is removed by releasing the retaining ring 134 from groove 132 through the opened spaces of one of the plurality of notches 250.

The disc clamp 129 and retaining ring 134 illustrated in FIG. 8 can be installed via the device illustrated in FIG. 4 or FIG. 6. Alternatively, the retaining ring 134 can be installed separately, for example, using a transverse force to expand the circumference of the retaining ring 134 to install the retaining ring 134 on the spindle hub 130. Prior to installation, the retaining ring is rotated so that the ends of the retaining ring 134 do not align with notches 250 on the spindle hub 130 so that the retaining ring 134 (as shown in FIG. 3) can be gripped for removal. In an illustrative embodiment, the installation tool includes a rotator device (not shown in FIG. 4 or 6) to align the retaining ring 134 with respect to notches 250 on the spindle hub 130. For example, the rotator device (not shown in FIG. 4 or 6) is coupled to the pusher/actuator 188 (or other retaining ring installation device) to orient the retaining ring 134 for installation.

The installation tool of the type illustrated in FIGS. 4 and 6 can be adapted for automated removal of the retaining ring 134 illustrated in FIG. 8. For example, the installation tool can include fingers that are configured to release or remove the retaining ring 134. For removal, the fingers are rotated by the rotator device so that the fingers, or other gripper device, align with the notches 250 on the spindle hub 130 to grip and remove the retaining ring 134. As described, notches 250 allow access to the retaining ring 134 in groove 132 so that the retaining ring 132 can be removed to remove the disc clamp from the spindle hub 130 after the disc clamp has already been assembled. The disc clamp 129 is removed by releasing the retaining ring 134 from groove 132 through the opened spaces of one or more of the plurality of notches 250.

Figure 9:
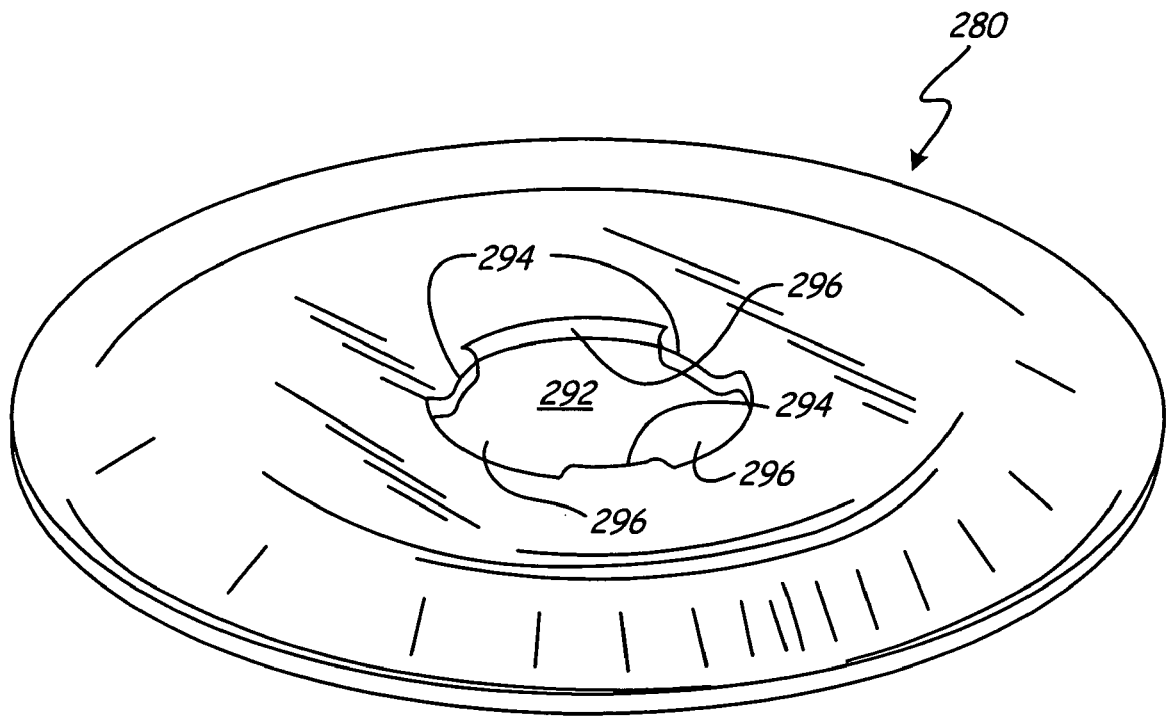
FIGS. 9-10 illustrate an embodiment of a spindle hub and disc clamp secured via cooperating flanges.

In contrast to the retaining ring shown in FIG. 8, disc clamps can be secured to spindle hubs via one or more flanges. FIG. 9 illustrates an embodiment of a disc clamp 280 that is assembled to spindle hub 282 illustrated in FIG. 10 via flanges. As shown, the spindle hub 282 of FIG. 10 includes a plurality of outer flange portions 284 spaced about an outer perimeter of a raised hub portion 286 and separated by void areas 288. The outer flange portions 284 extend radially outwardly to secure the disc clamp 280 to the spindle hub 282. Although, three outer flange portions 284 are shown in the illustrated embodiment, application is not limited to a particular number or design of outer flange portions 284. As shown, the spindle hub 282 includes a recessed groove 290 spaced below the outer flange portions 284 for assembly of the disc clamp.

Figure 11:
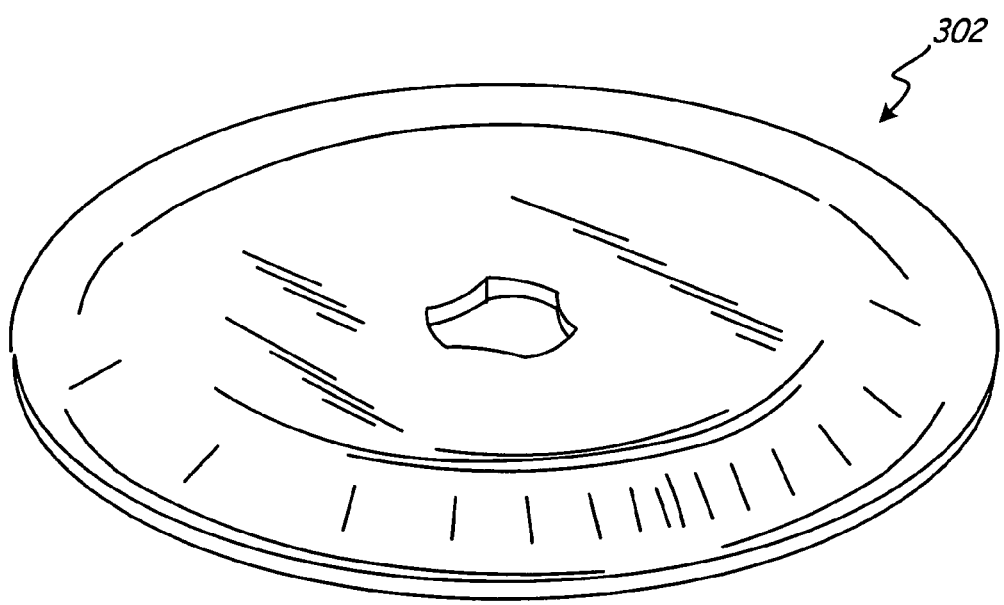
FIGS. 11-12 illustrate another embodiment of a spindle hub and disc clamp secured via cooperating flanges.
Figure 12:
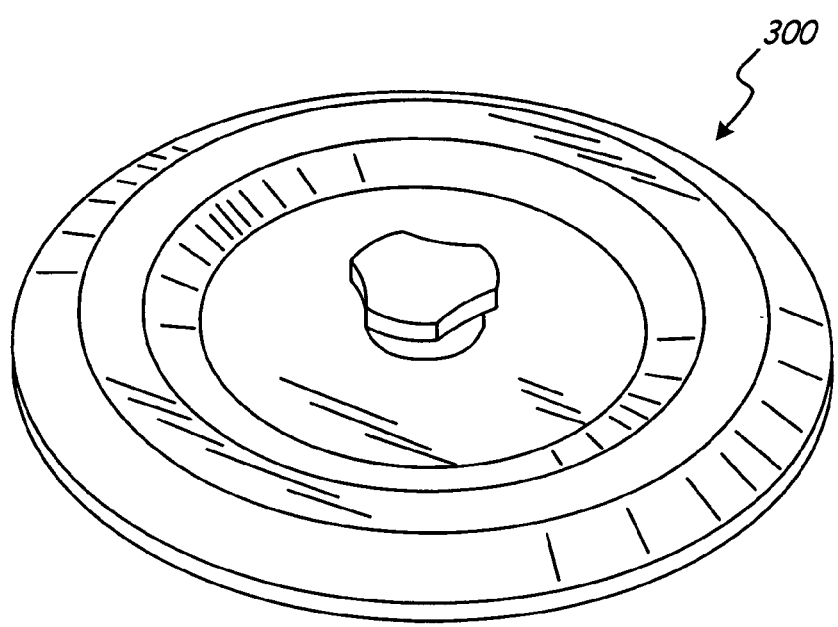

As shown in FIG. 9, the disc clamp 280 includes an inner opening 292 having a plurality of inner flange portions 294 spaced about a perimeter of the inner opening 292. The plurality of flanges portions 294 are separated by void areas 296. A circumferential dimension of the inner flange portions 294 is sized so that when the flange portions 294 of the disc clamp 280 are aligned with the void areas 288 of the spindle hub 282, the disc clamp 280 can be inserted over the spindle hub 282 and installed on the spindle hub 282 proximate to recessed groove 290. Following installation, the disc clamp 280 is rotated within groove 290 so that the flange portions 294 on the disc clamp 280 align with the flange portions 284 on the spindle hub 282 to secure the disc clamp 280 to the spindle assembly. FIGS. 11-12 illustrate an alternate embodiment of a spindle hub 300 and disc clamp 302 having flange portions to secure the disc clamp to the spindle assembly.

Figure 13:
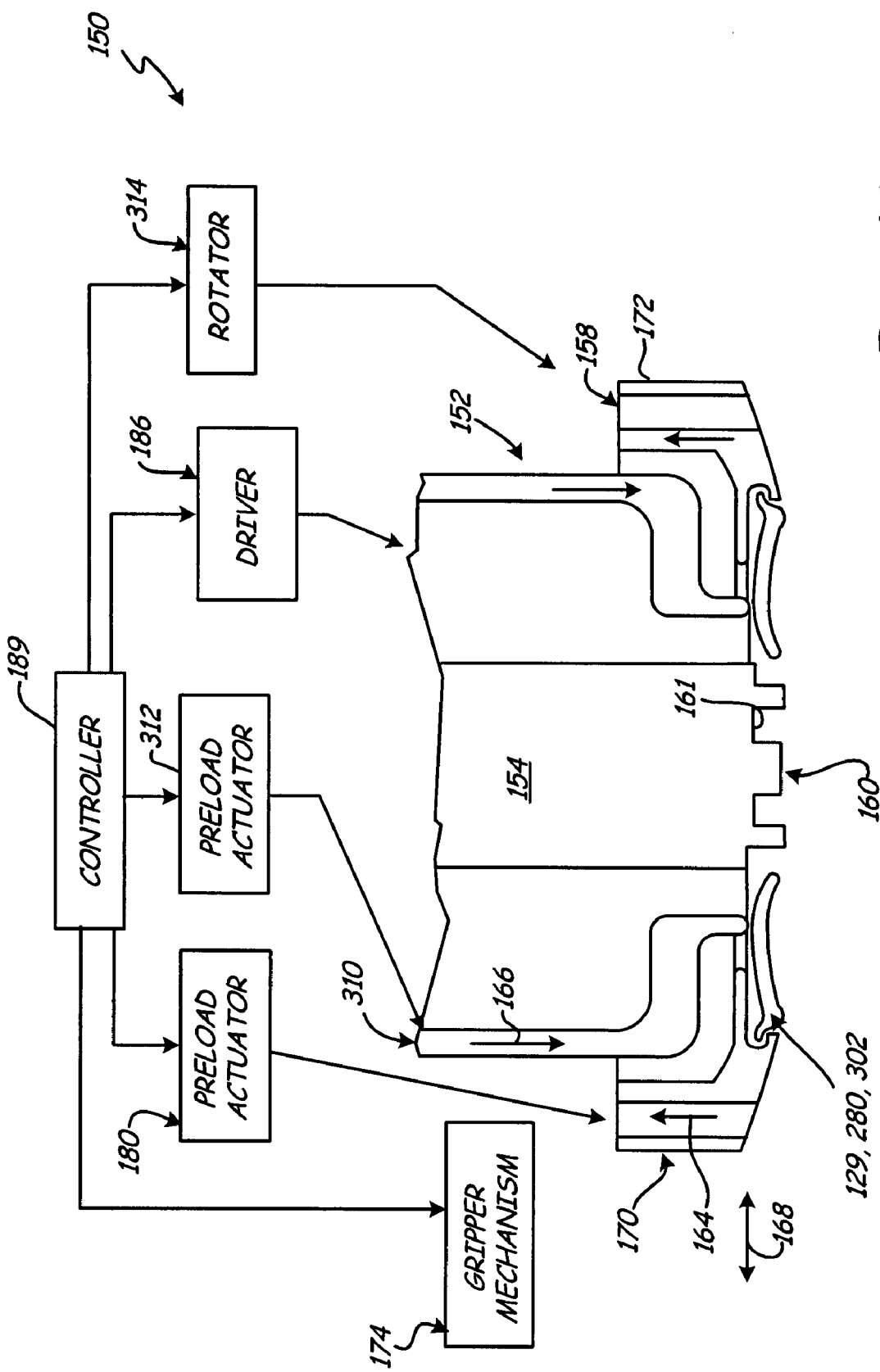
FIG. 13 schematically illustrates an alternate embodiment of an assembly tool to install a disc clamp on a spindle hub.

FIG. 13 illustrates an embodiment of an installation tool 150 to install a disc clamp on a spindle assembly having application for the embodiments illustrated in FIGS. 9-12. In the embodiment shown, the installation tool 150 includes a tool head 152 having an inner portion 154, an intermediate portion 310 and an outer portion 158 where like numbers are used to refer to like parts in the previous FIGS. As previously described with respect to FIG. 4, the inner portion 154 of the illustrated tool head 152 includes a raised center portion 160 which is sized for insertion into a center bore of the stationary portion (not shown in FIG. 13) to align the tool head 152 relative to the spindle assembly.

As shown, the outer portion 158 is spaced radially outwardly from the inner portion 154 and includes multiple sections which are movable in a radial direction as illustrated by arrow 168 to form the gripper portions 170, 172 for engaging and releasing the disc clamp 280 or 302. In the embodiment shown, the gripper portions 170, 172 have an inner contoured surface forming upper and lower portions. An outer edge portion of the disc clamp 280 or 302 is inserted between the upper and lower portions to hold the disc clamp for installation. As previously described, the gripper portions 170, 172 are movable in the axial direction via preload actuator 180 to supply a first preload force in an upward direction proximate to an outer edge or portion of the disc clamp 280 or 302 for installation.

The intermediate portion 310 is spaced radially inwardly from the outer portion 158 and is movable in the downward direction relative to the inner portion 154 via preload actuator 312 to supply a second preload force to an intermediate portion of the disc clamp 280 or 302 in a direction towards the spindle hub (not shown in FIG. 13). As previously described, driver 186 moves the head 152 towards the spindle hub 130 to load the disc clamp 280 or 302 on the spindle hub. Additionally as shown, the tool 150 includes a rotator 314 operably coupled to the gripper portions 170, 172 and the intermediate portion 310. The rotator 314 is configured to adjust or rotate the position of the gripper portions 170, 172 and intermediate portion 310 to adjust the orientation of the disc clamp 280 or 302 for installation or assembly.

In addition to the disc clamps 280 or 302 illustrated in FIGS. 9 and 11, the apparatus of FIG. 13 can be used to install other disc clamps such as the type illustrated in FIG. 8, for example. Illustratively, the disc clamp 129 of the type illustrated in FIG. 8 is assembled on the spindle hub 130 via head 152 while the retaining ring is assembled separately. In the illustrated embodiment, the rotator 314 aligns the disc clamp 129 for assembly, although application is not limited to rotation of the disc clamp 129 for assembly.

Figure 10:
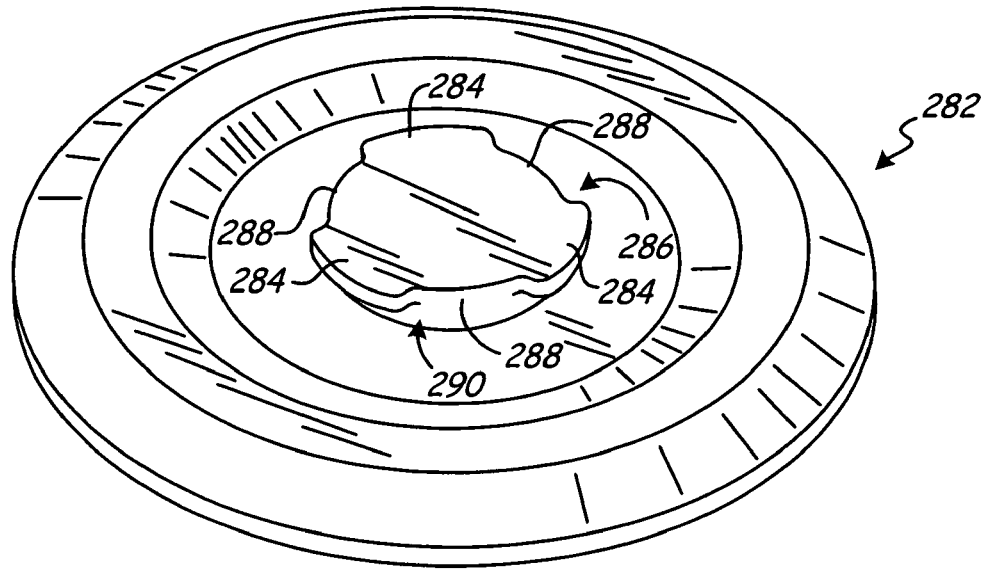
Figure 14:
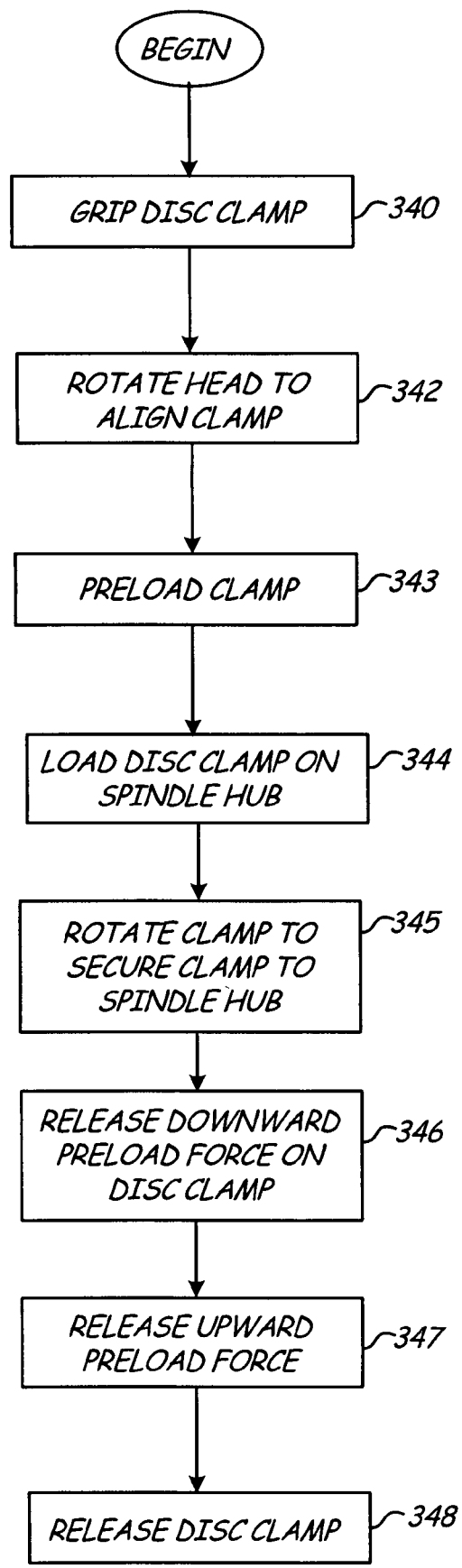
FIG. 14 illustrates steps for installing a disc clamp on a spindle hub of the type illustrated in FIGS. 9-12.

FIG. 14 illustrates steps for installing the disc clamp of FIG. 9 and FIG. 11 on the spindle hubs as illustrated in FIGS. 10 and 12 using an apparatus of the type illustrated in FIG. 13 wherein the intermediate and outer portions rotate to adjust the orientation of the disc clamp for installation. As shown, in step 310, the disc clamp is loaded on the tool head 152 via gripper portions 170, 172 as previously described. In step 342, the head 152 is rotated to align the head 152 and disc clamp 280 relative to the spindle hub 282. Specifically, the head 152 is rotated to align the flange portions 294 on the disc clamp 280 with the void areas 288 on the spindle hub 282. In step 343, the preload force or forces are supplied to the disc clamp via preload actuators 180, 312 as previously described with respect to FIG. 13. Alternatively, the disc clamp is preloaded in step 343 prior to step 342

In step 344, the disc clamp 280 is loaded onto the spindle hub 282 so that the disc clamp 280 is slid down into the groove 290 of the spindle hub 282. As previously described, the disc clamp 280 is loaded on the spindle hub 282 by lowering the head 152 toward the spindle hub 282. In step 345, the disc clamp 280 is rotated via rotation of the tool head 152 so that the flange portions 294 of the disc clamp 280 are radially aligned with the flange portions 284 of the raised hub portion 286 to secure the disc clamp 280 to the spindle hub 282.

Thereafter in step 346, the downward preload force supplied in the direction of the spindle assembly is released. Upon release of the downward force, the upward force biases the spindle hub 282 relative to the datum surface 161 of the head to align the spindle assembly relative to the head for installation of the disc clamp 129. In step 347, the upward preload force is released so that an outer portion of the disc clamp contacts a disc of the spindle assembly 120. In step 348, the disc clamp is released from the tool head 152 as previously described.

Figure 15:
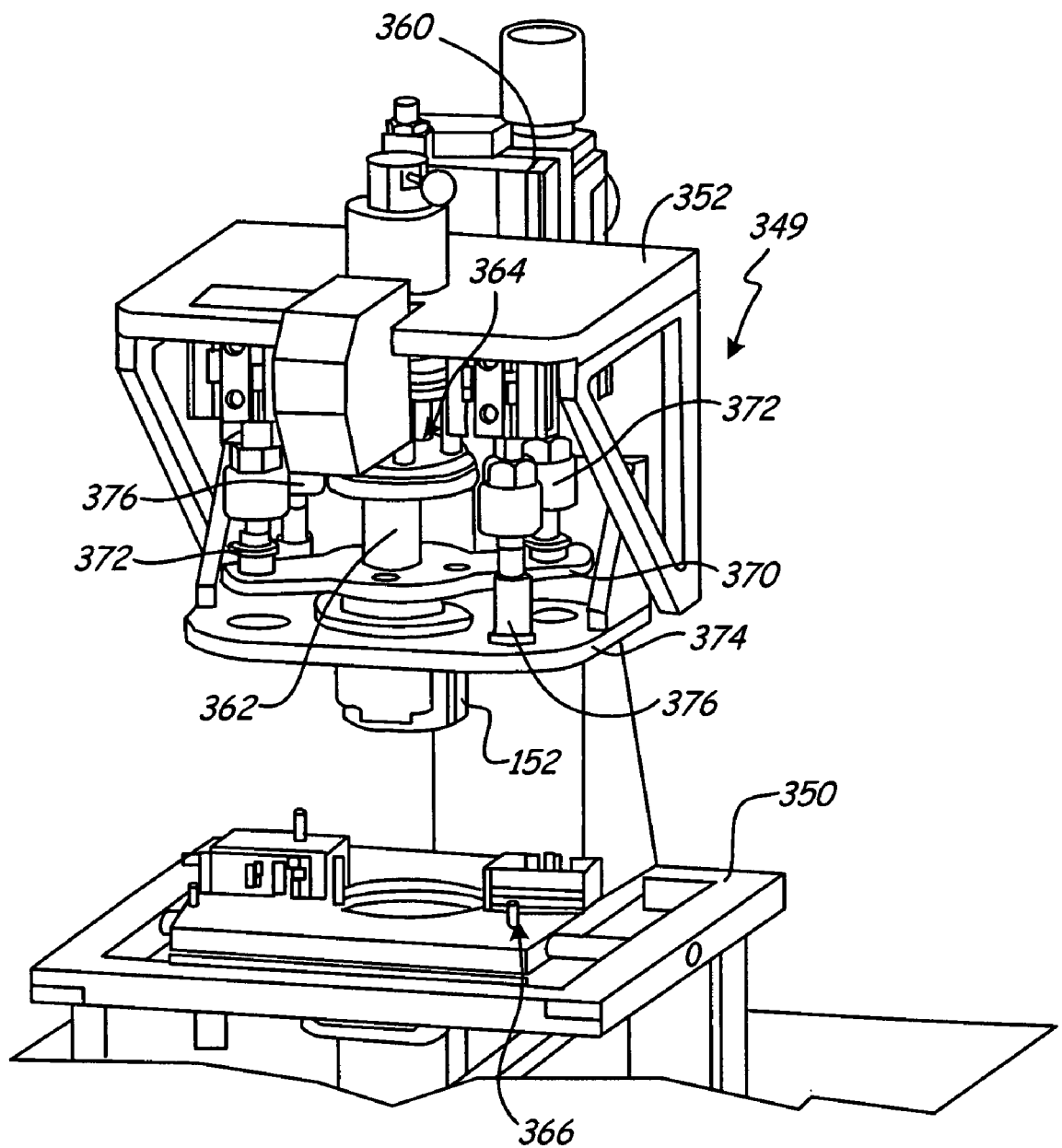
FIG. 15 illustrates an embodiment of an assembly tool including an assembly head for installing a disc clamp.

FIG. 15 illustrates an embodiment of an installation tool 349 including head 152 which can be used to install disc clamps on a spindle assembly at an assembly station 350 along an assembly line. As shown, the head 152 is coupled to a base platform assembly 352 that is movable along a slide 360 to raise and lower the head 152 to load the disc clamp 129 on the spindle hub 130. The tool includes an inner shaft 362 that forms the inner portion of the head. The shaft 362 is coupled to the base platform 352 via a remote center compliance device (RCC) 364 to align a raised center portion 160 (shown in FIG. 8) of the shaft 362 with a center bore 162 of the spindle assembly supported within a gimballed crowder plate 366. The RCC device 364 allows the alignment and position of the raised center portion 160 to shift so that the raised center portion 160 is inserted into the center bore 162 of the spindle assembly for installation. As shown in FIG. 15, the crowder plate 366 gimbally supports the spindle hub 130 so that the orientation of the spindle hub 130 adjusts to match the datum surface 161 of the inner portion of the head as previously described.

As previously described, the head includes an intermediate portion (not shown in FIG. 15) which is movable in an axial direction relative to the assembly station 350 through an intermediate platform 370 fixedly coupled to the intermediate portion (not shown in FIG. 15). As shown actuators 372 are fixedly supported relative to the base platform 352 and are coupled to the intermediate platform 370 to actuate the intermediate portion between a retracted position and an extended position to supply the downward force to the disc clamp. As shown, the actuators 372 are connected to opposed extended portion of the intermediate platform 370 to supply a balanced force to limit distortion or unevenness.

The outer portion (not shown in FIG. 15) of the head 152 is actuated through an outer platform 374 fixedly coupled to the outer portion of the head. As shown in FIG. 15, actuators 376 are fixedly supported relative to the base platform 352 and are coupled to the outer platform 374 to move the outer portion of the head in the axial direction to supply the upward force to an outer portion of the clamp. In an illustrative embodiment, actuators 372, 376 are pneumatic cylinders, however, application is not limited to the particular actuators or arrangement shown. Although a particular head 152 is described with respect to FIG. 15, application is not limited to a specific head and the installation tool 349 can incorporate any of the head configurations previously described, such as those illustrated in FIGS. 4, 6, and 13.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application while maintaining substantially the same functionality without departing from the scope and spirit of the present invention. In addition, although the preferred embodiments described herein are directed to a data storage device, it will be appreciated by those skilled in the art that the teachings of the present invention can be applied to other devices without departing from the scope and spirit of the present invention.

What is claimed is:

1. A method for clamping a disc comprising the steps of:
   supplying a first, clamping force to a disc clamp in a direction towards a spindle hub of a spindle assembly;
   supplying a second, preload force to the disc clamp to keep the disc clamp from contacting the disc;
   loading the disc clamp on the spindle hub; and
   after the disc clamp is loaded onto the spindle hub, releasing the first force while maintaining the second force on the disc clamp.

2. The method of claim 1 and comprising the steps of:
   gripping the disc clamp through a gripping mechanism on a head of an assembly tool; and
   moving the head of the assembly tool towards the spindle hub to load the disc clamp on the spindle hub.

3. The method of claim 1 wherein the step of supplying the first and second forces comprises:
   supplying the second force along an outer portion of the disc clamp in a direction opposite to the first force; and
   supplying the first force along an intermediate portion of the disc clamp spaced radially inwardly from the outer portion of the disc clamp in the direction towards the spindle hub.

4. The method of claim 1 and comprising the steps of:
   moving a plurality of gripper portions in a radial direction to grip the disc clamp; and
   moving the plurality of gripper portions in an axial direction to supply the second force to the disc clamp.

5. The method of claim 1 and comprising the steps of:
   loading a spindle assembly into a gimbaled crowder plate; and
   biasing the spindle hub against a traverse datum surface of an assembly head prior to releasing the second force.

6. The method of claim 1 and comprising the step of:
   inserting a raised portion of a head of an assembly tool into a recess of the spindle hub to align the head of the assembly tool relative to the spindle hub prior to loading the disc clamp on the spindle hub.

7. The method of claim 1 and further comprising the step of:
   rotating the disc clamp prior to loading the disc clamp on the spindle hub.

8. The method of claim 1 and further comprising the step of:
   rotating the disc clamp following the step of loading the disc clamp on the spindle hub.

9. The method of claim 3 comprising:
   securing the disc clamp to a head of the assembly tool;
   moving an intermediate portion of the head of the assembly tool in a first direction to supply the first force along the intermediate portion of the disc clamp; and
   moving an outer portion of the head radially spaced from the intermediate portion in a second direction opposite to the first direction to supply the second force along the outer portion of the disc clamp.

10. The method of claim 1 and comprising the step of:
    loading one or more data storage discs on the spindle assembly prior to loading the disc clamp on the spindle hub.

11. The method of claim 1 and comprising the step of:
    assembling the spindle assembly in a data storage device.

12. The method of claim 1 wherein the first force and the second force are supplied prior to loading the disc clamp on the spindle hub.

13. The method of claim 9 and comprising the steps of:
    securing a retaining ring to the head of the assembly tool; and
    supplying a force in the direction towards the spindle hub to install the retaining ring after loading the disc clamp on the spindle hub.

14. The method of claim 9 and comprising the steps of:
    loading the spindle assembly on a gimbaled crowder plate configured to gimbally support the spindle hub; and
    releasing the first force to bias the spindle assembly against a traverse datum surface along an inner portion of the head spaced radially inwardly from the intermediate portion and the outer portion of the head via application of the second force.

15. The method of claim 9 wherein the outer portion of the head comprises a plurality of gripper portions movable in a radial direction and comprising the step of:
    moving the plurality of gripper portions in the radial direction to grip the disc clamp for assembly.

16. The method of claim 15 wherein the assembly tool comprises a rotator coupled to the assembly head and comprising the step of:
    rotating at least one of the outer portion and the intermediate portion relative to an inner portion prior to releasing the second force in the direction opposite to the first force.

17. The method of claim 9 and comprising:
    operating a first actuator coupled to the intermediate portion of the assembly tool to supply the first force; and
    operating a second actuator coupled to the outer portion of the assembly tool to supply the second force.

18. The method of claim 9 wherein the intermediate portion is a first intermediate portion and comprising the step of:
    moving a second intermediate portion spaced radially inwardly from the first intermediate in the first direction.

19. The method of claim 18 and comprising:
    securing a retaining ring relative to the second intermediate portion of the assembly head; and
    moving the second intermediate portion in the first direction to install the retaining ring to secure the disc clamp to the spindle hub.

* * * * *